(12) United States Patent
Marchin

(10) Patent No.: US 9,982,109 B2
(45) Date of Patent: May 29, 2018

(54) INDIVIDUALISED INORGANIC PARTICLES

(71) Applicant: PYLOTE, Dremil-lafage (FR)

(72) Inventor: Loic Marchin, Mons (FR)

(73) Assignee: PYLOTE, Dremil-Lafage (FR)

( * ) Notice: Subject to any disclaimer, the term of this patent is extended or adjusted under 35 U.S.C. 154(b) by 0 days. days.

(21) Appl. No.: 15/308,651

(22) PCT Filed: May 7, 2015

(86) PCT No.: PCT/FR2015/051223
§ 371 (c)(1),
(2) Date: Nov. 3, 2016

(87) PCT Pub. No.: WO2015/170060
PCT Pub. Date: Nov. 12, 2015

(65) Prior Publication Data
US 2017/0190867 A1 Jul. 6, 2017

(30) Foreign Application Priority Data
May 7, 2014 (FR) ..................................... 14 54141

(51) Int. Cl.
*C08J 9/32* (2006.01)
*C08K 3/22* (2006.01)
*C08K 7/24* (2006.01)
*C09C 1/62* (2006.01)
*C09C 1/00* (2006.01)

(52) U.S. Cl.
CPC ................. *C08K 3/22* (2013.01); *C08K 7/24* (2013.01); *C09C 1/0081* (2013.01); *C09C 1/62* (2013.01); *C08K 2003/2227* (2013.01); *C08K 2003/2244* (2013.01); *C08K 2201/003* (2013.01); *C08K 2201/006* (2013.01)

(58) Field of Classification Search
CPC .......... C08K 3/22; C08K 7/24; C09C 1/0081; C09C 1/62
See application file for complete search history.

(56) References Cited

U.S. PATENT DOCUMENTS

| 5,851,715 A | 12/1998 | Barthel et al. | |
| 2010/0247914 A1* | 9/2010 | Enomoto | A61K 8/25 428/402 |
| 2017/0130027 A1* | 5/2017 | Marchin | C08K 3/22 |

FOREIGN PATENT DOCUMENTS

| DE | 10 2012 206004 A1 | 10/2013 |
| FR | 2 973 260 A1 | 10/2012 |
| WO | 2013/123517 A1 | 8/2013 |

OTHER PUBLICATIONS

Roger Mueller et al.: "Non-agglomerated dry silica nanoparticles", Powder Technology, vol. 140, No. 1-2, Feb. 1, 2004 (Feb. 1, 2004), pp. 40-48, XP055166873, ISSN: 0032-5910, DOI: 10.1016/j.powtec.2004.01.004.
Imai et al.: "Elasticoluminescence of europium-doped strontium aluminate spherical particles dispersed in polymeric matrices", Materials Letters, North Holland Publishing Company. Amsterdam, NL, vol. 61, No. 19-20, Jun. 22, 2007 (Jun. 22, 2007), pp. 4124-4127, XP022130064, ISSN: 0167-577X, DOI: 10.1016/J.Matlet.2007.01.069.
Donna M. Speckman et al.: "Synthesis of Indium Oxide Microspheres for Antistatic Spacecraft Coatings", MRS Proceedings, vol. 372, Jan. 1, 1994 (Jan. 1, 1994), XP055167001, DOI: 10.1557/PROC-372-247.
Gun Young Hong et al.: "Photoluminescence Characteristics of Spherical Y[sub 2]O[sub 3]:Eu Phosphors by Aerosol Pyrolysis", Journal of the Electrochemical Society, vol. 148, No. 11, Jan. 1, 2001 (Jan. 1, 2001), pp. H161, XP055166876, ISSN: 0013-4651, DOI: 10.1149/1.1406496.
Strobel R et al.: "Flame aerosol synthesis of smart nanostructured materials", Journal of Materials Chemistry, Royal Society of Chemistry, GB, vol. 17, Sep. 25, 2007 (Sep. 25, 2007), pp. 4743-4756, XP002540713, ISSN: 0959-9428, DOI: 10.1039/B711652G.
International Search Report, dated Aug. 14, 2015, from corresponding PCT application.

* cited by examiner

*Primary Examiner* — Hannah Pak
(74) *Attorney, Agent, or Firm* — Young & Thompson

(57) ABSTRACT

A set of spherical inorganic particles having the particular property of being spontaneously individualized, both in dry state in the form of a powder and when they are dispersed in a matrix. The method for producing the particles, and the materials produced by including the particles in the matrices are also described.

14 Claims, 13 Drawing Sheets

INDIVIDUALISED INORGANIC PARTICLES

The present invention relates to inorganic particles having the particular property of being spontaneously individualised, both in dry state in the form of a powder and when they are dispersed in a matrix. The invention also relates to a method for producing said particles, and to the materials produced by including said particles in the matrices.

STATE OF THE ART WITH REGARD TO THE INVENTION

In the field of materials, it is common to use particles to impart desired properties to a material, and as there is a wide range of particles, it is possible to obtain an equally wide range of properties. The properties imparted to a material by nano and/or microparticles are generally linked to the properties of the particles themselves, especially their morphological, structural and/or chemical properties.

Particles of spherical morphology are particularly useful across a variety of fields. Particles that are said to be spherical are often either aggregates of non-spherical particles, the aggregate itself having a shape approximating a sphere, or particles that have an unsatisfactory degree of sphericity. Various methods have been developed to optimize the sphericity of the synthesized particles. Most of these processes are optimized for one type of particles only, for example, a chemical type (such as silica particles) or a morphology (such as hollow particles).

As a result, it would be advantageous to have new methods for the synthesis of spherical particles of any kind and morphology.

The dispersion of particles in matrices is also a conventional technique to impart a desired property to such matrices. For example, pigments can be dispersed in matrices to impart colour properties to them. The nature of the particles, their surface properties, and optionally their coating, must be optimized in order to achieve a satisfactory level of dispersion in the matrix. Optimization of the dispersibility of particles in the matrix depends on both the nature of the particles and the nature of the matrix. It is important to be able to achieve a relatively homogenous dispersion of the particles in the matrix, in order to distribute the desired property homogeneously throughout the entire volume. If the particles agglomerate in the matrix, the desired properties have not been homogeneously imparted to the matrix, and the desired result (the matrix with its desired property) has not been satisfactorily achieved.

As a result, it would be advantageous to have new processes to allow satisfactory dispersion of any type of particles in any matrix.

In this context, the applicant has found a method allowing the preparation of micrometric, perfectly spherical, inorganic particles of different chemical natures and morphologies. Surprisingly, the particles obtained by this process, regardless of their chemical composition and morphology, remain in an individualised state and do not aggregate, regardless of whether they are dry or dispersed in a matrix.

SUMMARY OF THE INVENTION

The first object of the present invention is a set of micrometric spherical inorganic particles, characterized by the fact that the particles are individualised, particularly in their dry state or in a matrix.

A second object of the invention is a material comprising a set of particles, according to the invention, substantially and homogeneously dispersed in a matrix.

A third object of the invention is a method for the preparation of a set of particles according to the invention.

A final object of the invention is a process for the preparation of a material according to the invention, comprising the contacting of a matrix as defined above with at least one set of particles according to the invention.

DETAILED DESCRIPTION OF THE INVENTION

The first object of the present invention is a set of micrometric spherical inorganic particles, characterized by the fact that the particles are individualised, particularly in dry state or in a matrix.

In the present invention, a set of individualised particles refers to a collection of particles wherein the particles are not aggregated, meaning that each particle of the set is not bound to any other particles by strong chemical bonds such as covalent bonds.

A set of particles produced according to the invention may contain some particles that do meet this characteristic, provided the criterion of non-aggregation is met by at least 50% of the total number of particles. Preferably, at least 60%, at least 70%, at least 80%, at least 90%, and at least 95%, by number, of the particles of the set under consideration will be individualised.

Preferably, a particle of the set being considered according to the invention is not made up of an aggregation of several other smaller particles. This can be clearly visualized by, for example, microscopy studies, including scanning, or transmission, electron microscopy. This means that the only possible constituents of the particles according to the invention are those of crystallite size, which are significantly smaller than the sizes of particles according to the invention. A particle, according to the invention, is preferably formed of at least two crystallites. A crystallite material is a type of material having the same structure as a single crystal; that is to say that within each atomic plane of its structure there are no major discontinuities of the crystalline order with the exception of point defects (vacancies or atoms inserted or substituted) or linear defects (dislocations).

Figure 13:
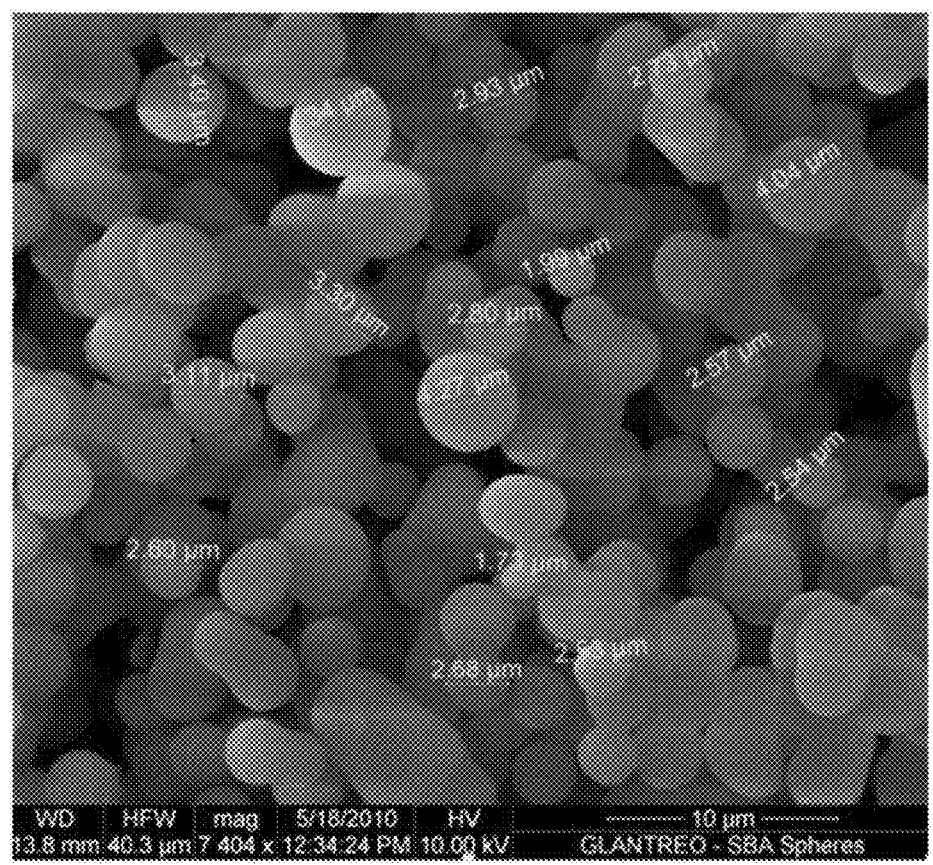
FIG. 13: SEM (Scanning Electron Microscopy) image of commercial mesoporous silica particles.

For the sake of comparison, the atomization techniques conventionally used in the art generally provide aggregated non-spherical particles. Objects that are formed using these aggregated particles may be spherical. FIG. 13 shows an image of an electron microscopy scan of commercial mesoporous silica particles. The particles are not perfectly spherical and can be aggregated, which is not the case with the particles of the present invention.

The particles according to the invention are spherical, which means that they have a sphericity coefficient greater or equal to 0.75. Preferably, the sphericity coefficient is greater than or equal to 0.8, greater than or equal to 0.85, greater than or equal to 0.9, or greater than or equal to 0.95.

The coefficient of sphericity of a particle is the ratio of the smallest diameter of the particle to its largest diameter. For a perfect sphere, the ratio is 1. The sphericity coefficient can be calculated, for example, by measuring the aspect ratio using any software adapted to deal with images, for example, images obtained by microscopy, in particular, scanning electron microscopy (SEM) or transmission electron microscopy (TEM).

One embodiment of the invention relates to a set of particles as defined above. In this embodiment, the set may contain, on an ad hoc basis, particles that do not meet the criterion of having the required sphericity, to the extent that the average sphericity, as a quantity, of all the particles meets the criteria set-out as part of the present invention. Thus, the phrase "set of spherical particles" refers to a plurality of particles containing at least 50% of particles with a sphericity as defined above. Preferably at least 50%, at least 60%, at least 70%, at least 80%, at least 90%, at least 95% by number of the particles of the considered set have a sphericity as defined above.

In the invention, the term inorganic particle means a particle comprising, at least partly, a non-organic product, i.e. one that is not derived from carbon chemistry (with the exception of $CO_3^{2-}$). The chemical diversity of inorganic particles is well-known by the skilled worker. In particular, the inorganic particles can include metal (or alloy) particles, metal oxide, silicate, phosphate (or apatite), borate, fluoride, carbonate, hydroxycarbonate, vanadate, tungstate, sulphide and/or oxysulphide, optionally combined with organic compounds such as latex; this list is not exhaustive. In particular, the inorganic particles may include metallic element oxides or semiconductors, such as silica, zinc oxide, magnesium oxide, titanium dioxide, alumina, barium titanate or a mixture of these. The inorganic particles may also contain transition metals such as copper, zinc or iron, or rare earth metals such as yttrium or lanthanides, and/or some of their derivatives such as oxides.

The inorganic particles according to the invention may include at least one dopant, such as aluminium, erbium, europium or ytterbium. The dopant is included up to a maximum concentration of 10% by weight, preferably a maximum of 5% by weight, and, in particular, a maximum of 2% by weight.

The particles produced according to the invention may include a minor proportion, for example, less than or equal to 5% by weight, of contaminants that may have a different chemical nature from the particles themselves.

In a preferred embodiment, the inorganic particles are ZnO particles, in particular hexagonal ZnO, optionally doped, for example, doped with aluminium, alumina particles, particularly amorphous alumina, cubic or rhombohedral boehmite particles, especially orthorhombic, silica particles, particularly amorphous silica, particles of copper oxide, preferably cubic copper oxide, titanium oxide particles, in particular anatase or rutile, mixed oxide particles of silicon and titanium, especially anatase, montmorillonite particles, in particular monoclinic, particles of hydrotalcite, in particular hexagonal, of magnesium dihydroxide particles, in particular hexagonal, magnesium oxide particles, in particular cubic, zirconium dioxide particles, in particular quadratic, of particles of yttrium oxide $Y_2O_3$, in particular cubic, optionally doped with europium and/or erbium and/or ytterbium, cerium dioxide particles, particles of zirconia stabilized with yttrium, particles of $CaCu_3Ti_4O_{12}$, Particles of $BaTiO_3$, preferably cubic, particles of iron oxide, preferably in the form of hematite, magnesium sulphate particles, preferably orthorhombic, $Zn_{0.18}Mn_{0.82}Fe_2O_4$ particles, preferably cubic, particles of $Mn_2P_2O_7$, preferably monoclinic, nickel manganese oxide particles, mullite particles, particles of $ZnFe_2O_4$, particles of $MnFe_2O_4$, particles of $NiFe_2O_4$, particles of $CoFe_2O_3$, particles or $MgAl_2O_4$, or particles of $Y_3Al_5O_{12}$.

In a particular embodiment, the inorganic particles are ZnO particles, in particular of hexagonal ZnO, optionally doped, for example doped with aluminum, alumina particles, particularly amorphous alumina, cubic or rhombohedral particle boehmite, particularly orthorhombic, of copper oxide particles, preferably cubic copper oxide, montmorillonite particles, in particular monoclinic, particles of hydrotalcite, in particular hexagonal, of MDH particles, especially hexagonal, of magnesium oxide particles, in particular cubic, cerium dioxide particles, particles of zirconia stabilized with yttrium, particles of $CaCu_3Ti_4O_{12}$, particles of $BaTiO_3$, preferably cubic, particles of iron oxide, preferably in the form hematite, magnesium sulphate particles, preferably orthorhombic, $Zn_{0.18}Mn_{0.82}Fe_2O_4$ particles, preferably cubic, particles of $Mn_2P_2O_7$, preferably monoclinic, nickel manganese oxide particles, mullite particles, particles of $ZnFe_2O_4$, particles of $MnFe_2O_4$, particles of $NiFe_2O_4$, particles of $CoFe_2O_3$, particles or $MgAl_2O_4$, or particles of $Y_3Al_5O_{12}$.

In a more specific embodiment, the particles are particles of MgO, ZnO, $ZrO_2$ stabilized with yttrium, of Mullite ($SiO_2/Al2O_3$), of alumina, or of other corresponding doped particles. In another more specific mode, the particles are particles of MgO, ZnO, $ZrO_2$ stabilized with yttrium, of Mullite ($SiO_2/Al2O_3$), or other corresponding doped particles.

According to an embodiment, the inorganic particle includes several chemical elements, preferably from 2 to 16 different chemical elements, where this number of elements does not take into account the O and H elements that may be included in the particle. These particles therefore become heterogeneous particles, meaning that they comprise several elements whose stoichiometry is preferably controlled by the method of synthesis.

Due to the rapidity of the preparation method for the particles, and the possible existence of a quenching step at the end of the method of particle preparation according to the invention, the particles may include any chemical component that can be densified, in particular, crystallized, even metastable phases. The specific conditions used in the process enable compositions to be obtained in a densified form where the degradation temperature is below the temperature actually applied because the time spent at high temperature is very short. In this case, the phrase "high temperature" refers preferably to a temperature higher than 40° C. The phrase "time spent at high temperature" generally refers to the time required for the drying, pyrolysis and densification stages. Preferably, the time spent at high temperature does not exceed 70 seconds. More specifically it is between 30 and 70 seconds. Preferably, quenching is characterized by a cooling rate greater than or equal to 100° C. or greater than 300° C. per second. In one embodiment, the particles comprise a type of oxide which requires an energy input to achieve densification, particularly for crystallization. This can include, for example, alumina, zinc oxide, iron oxide, titanium dioxide (rutile), cubic or monoclinic $ZrO_2$, and oxides of rare earth metals (lanthanides and/or yttrium). Such particles cannot be obtained in the same way by conventional methods used in the prior art, particularly those that do not include a quenching stage.

Heterogeneous particles can either comprise several chemical elements (except O and H), preferably all chemical elements (except O and H) forming the particle, within each crystallite, or include crystallites each formed of a single chemical element (excluding O and H). In a particular embodiment, each crystallite of the heterogeneous particle comprises a single element (excluding O and H).

The particles, according to the invention, are micrometric, meaning that their diameter is between 0.1 and 1000 micrometers. Preferably, the diameter of particles produced according to the invention, is between 0.1 and 600 micrometers, more specifically between 0.1 and 100 micrometers. In a preferred embodiment, it is between 0.1 and 10 micrometers. According to another specific embodiment, the particle diameter is between 0.2 and 5 micrometers and preferably between 0.5 and 3 micrometers. The skilled person knows the right techniques to be used to determine the value of the diameter of the particles, or aggregates of particles, according to the invention, and also knows the degree of uncertainty that relates to these measures. For example, the average diameter of the particles in a set, standard deviation and size distribution can be determined, in particular, by statistical studies of microscopy images, for example, those generated by scanning electron microscopy (SEM) or transmission electron microscopy (TEM).

When the particles are part of a set, diameters values as specified above may correspond to the average diameter of all particles, even if some of the particles in the set have diameters outside this range. Advantageously, all particles in the set have a diameter as defined above.

In one embodiment, the standard deviation of particle sizes in any set of particles produced according to the invention is less than or equal to 25%, preferably less than or equal to 20%.

The distribution of particle sizes in the entire set of particles, according to the invention, can be monomodal or multimodal.

The use of micrometric particles in the present invention can encourage the dispersion properties of the particles, as a result of them not being too large, without entailing the possible drawbacks associated with nanoparticles (application difficulties, toxicity, etc.).

The particles prepared according to the invention may have different morphologies. For example, they may be solid, hollow, porous, mesoporous, non-porous and can also encapsulate or include other entities such as organic molecules, in which case they will be organic-inorganic hybrid particles or inorganic compositions particularly in the form of nanoparticles. This encapsulation can be achieved either during the synthesis of the particles or by post-processing. When the particles are hollow, the thickness of the wall can be controlled, in particular by means of varying the parameters in the synthesis process.

In the present invention, according to the IUPAC definition, a material is defined as microporous when it has pores smaller than 2 nm. A material is defined as mesoporous when it has pores of a size between 2 and 50 nm. A material is defined as macroporous when it has pores of a size greater than 50 nm.

Typically, the mesoporous materials can be compositions of an amorphous or paracrystalline silica type, in which the pores are usually randomly distributed, with a pore size distribution that can be very large.

A major advantage of the invention is its ability to produce micrometric particles, of the sizes defined above, that also have high specific surface areas. In a particular embodiment, the particles of the invention have surface areas greater than or equal to 15 $m^2$/g, preferably greater than or equal to 30 $m^2$/g. The specific surface area of the particles according to the invention can be up to 700 $m^2$/g or 600 $m^2$/g. Naturally, the specific surface areas vary, particularly depending on the particle diameter and porosity.

According to a particular embodiment, the mean diameter of the particles according to the invention is between 0.2 and 5 micrometers and preferably between 0.4 and 3 micrometers, and exhibiting specific surface areas greater than or equal to 15 $m^2$/g, preferably greater than or equal to 30 $m^2$/g. The specific surface areas can be measured by various methods, especially the Brunauer, Emmett, Teller (BET) method or the Barrett, Joyner, Halenda (BJH) method. The specific surface area values given above are measured according to the BET method unless otherwise specified.

A second object of the invention is a material comprising particles, according to the invention, which are substantially and homogeneously dispersed within a matrix.

According to the present invention, the term 'matrix' refers to any material that might benefit advantageously from the inclusion of particles produced according to the invention. In particular, it may refer to solid or liquid matrices, regardless of the viscosity of the liquid matrix.

In one embodiment, the matrix is a liquid matrix, for example, a solvent, preferably an aqueous solvent such as water or an alcohol such as ethanol or ethylene glycol, or else an organic solvent such as methyl methacrylate. The liquid matrix may also comprise a mixture of solvents, or a pre-mixture of solvents which may be concentrated or not.

In one embodiment, the matrix is a solid matrix, for example, a metallic matrix, ceramic or polymeric matrix, particularly a thermoplastic polymer matrix. Thermoplastic polymeric matrices that can be used according to the invention include, in particular, polyethylene, polyethylene terephthalate, polypropylene, polyoxymethacrylate, ABS (Acrylonitrile Butadiene Styrene) or poly (ethylenevinylacetate).

In a matrix, the inclusion of particles according to the invention allows the impartation of properties specific to the matrix, in particular mechanical, thermal and/or physicochemical properties. The inclusion of particles in the matrix may be carried out by conventional techniques used in the art, for example by mechanical stirring while the matrix is a liquid.

In particular, the material according to the invention may be obtained in the form of liquid, powder, beads, pellets, granules, and/or extrudates, the forming operations being carried out using conventional techniques known to a skilled worker, particularly when the matrix is a polymeric matrix.

In particular, the forming process of the material does not require any further step for dispersing the particles within the matrix, compared with the forming process conventionally used for matrices which do not include particles. The forming process may be employed preferably with processing equipment and in sectors where matrices without particles are typically used. In some embodiments, the dispersion of particles within the matrix may be performed without any additional chemical dispersant.

In a particular embodiment, the dispersion of the particles within the matrix is performed with or without a chemical dispersant such as a surfactant. Skilled workers are able to determine whether the use of a dispersant is required to obtain the desired dispersion, and to adjust the amount of dispersing agents to be used as appropriate. For example, the dispersant may be used in any amount between 0.5 and 50% by weight, in particular in any amount between 0.5 and 20% by weight.

A specific feature of the particles according to the invention is that they can be dispersed substantially and homogenously throughout the volume of the matrix, regardless of their chemical nature, morphology or the nature of the matrix itself. This means that the density of particles per volume unit is generally the same at any point within the matrix.

In the case of a solid matrix, the density of particles per unit area is preferably about the same, regardless of the matrix surface, whether this surface is at one of the extremities of the matrix or a surface obtained by, for example, cutting the material. Thus, the property or properties that is/are imparted to the matrix by the inclusion of particles according to the invention is/are distributed substantially and homogeneously throughout the volume of the matrix.

The material produced according to the invention may comprise particles according to the invention in any proportion, adapted to the material to give it the desired properties. For example, the material may comprise between 0.1 and 80% by weight of particles, relative to the total weight of the matrix and particles, preferably between 1 and 60% by weight, and especially between 2 and 25% by weight.

Preferably, the particles according to the invention are non-deformable individualised particles. Also, the surface of each particle which is in contact with other particles is generally very weak. In one embodiment, the radius of curvature of the meniscus forming the contact between two different particles of the set is less than 5%, preferably less than 2%, of the radius of each of the two particles, especially within a matrix or in powder form.

The sphericity of the particles according to the invention also allows, for the same loading rate within a liquid matrix, a lower viscosity to be obtained than with non-spherical particles.

Another object of the present invention is a process for the preparation of a set of particles according to the invention, as described above. The process according to the invention is a process known as "aerosol pyrolysis" (or spray pyrolysis), which takes place at drying temperatures and not necessarily pyrolysis temperatures. This process represents an enhanced process compared with, in particular, the aerosol pyrolysis process described in patent application FR2973260. More precisely, the process carried out according to the invention generally takes place in a reactor. The set of particles thus obtained may correspond to large quantities, more specifically the amount obtained may be more than 100 g, 500 g, 1 kg, 15 kg or 20 kg, with this amount varying according to the feed rate of solution to the reactor that occurs/is required. The set of particles created therefore has the advantage of being obtained in large quantities while maintaining the particle characteristics described above.

This method comprises the following steps:
(1) nebulization of a liquid solution containing a precursor to one or more inorganic material(s), from which the particles are to be formed, at a given molar concentration in a solvent, which is used to obtain a spray of droplets of the solution,
(2) heating of the spray (referred to as drying) to a temperature sufficient to ensure the evaporation of the solvent and the formation of particles,
(3) heating of the particles to a temperature (referred to as pyrolysis) sufficient to ensure the decomposition of the precursor to form the inorganic material,
(4) optionally, densification of the particles, and
(5) recovery of the particles thus formed.

Step (1) of the nebulization is performed preferably at a temperature of 10 to 40° C., and/or preferably for a duration less than or equal to 10 seconds, in particular, less than or equal to 5 seconds. In step (1), the liquid solution is generally in the form of an aqueous or hydroalcoholic solution or in the form of a colloidal sol. More specifically, the liquid solution of step (1) is introduced into a reactor by nebulization.

Step (2), the heating (drying) step, is preferably carried out at a temperature of 40 to 120° C., and/or preferably for a period less than or equal to 10 seconds, in particular between 1 and 10 seconds.

Step (3), referred to as pyrolysis, is preferably carried out at a temperature of 120 to 400° C., and/or preferably for a period less than or equal to 30 seconds, in particular between 10 and 30 seconds.

Step (4), the optional densification, may be performed over a wide range of temperatures, especially between 200 and 1000° C. This step is preferably carried out at a temperature of 400 to 1000° C., especially when the particles that are to be prepared are at least partly in crystalline form. When seeking to obtain dense but non-crystallized particles, especially amorphous particles, densification temperature can be lower, for example, it may be around 200° C. to 300° C., particularly for amorphous silica. Preferably, the densifying step is carried out for a duration less than or equal to 30 seconds, in particular between 20 and 30 seconds.

Step (5), particle recovery, is preferably carried out at a temperature below 100° C., and/or preferably for a period less than or equal to 10 seconds, in particular, less than or equal to 5 seconds. Step (5), particle recovery, is preferably carried out by deposition of the particles on a filter at the reactor outlet.

The temperature of each step may be outside the temperature ranges given above. For a given set of particles, the temperature to be applied can depend on the flow rate at which the drops and the particles circulate in the reactor. The more quickly the drops and the particles circulate in the reactor, the lower their residence time and higher the temperature required in the reactor to achieve the same result.

Preferably, steps (2), (3) and (4) are carried out in the same reactor. In particular, all the steps in the method (except the post-processing steps) are carried out in the same reactor.

The entirety of the steps in the method, especially steps (2), (3) and (4), are effected as a continuous sequence, one after the other. The temperature profile applied to the reactor is adapted as a function of the particles to be formed such that these three steps take place one after the other. Preferably, the temperature in the reactor is adjusted by means of at least one, and preferably three, heating elements, whose temperatures can be set independently.

The method according to the present invention preferably comprises a step (4a) in which the particles are quenched, which comes between step (3), or the optional step of particle densification (4)—if there is to be one, and the particle recovery step (5). The quenching step (4a) corresponds to a rapid decrease in temperature. More specifically, if a particle densification step (4) is included, the quenching step is preferably carried out, and advantageously involves a temperature decrease of at least 300° C./s, in order to obtain, for example, a temperature between 15 and 50° C. More specifically, if a particle densification step (4) is not included, the quenching step may take place, and, if it takes place, it preferably corresponds to a temperature decrease at least 100° C./s. The quenching step (4a) is preferably carried out by the input of a gas, preferably cold air, to all or part of the circumference of the reactor. In the present invention, a gas is considered cold if it is at a temperature between 15 and 50° C., preferably between 15 and 30° C. In one embodiment, the gas entering the reactor is a gas different from air. In particular, it may be a neutral gas (such as nitrogen or argon), a reducing gas (such as hydrogen or carbon monoxide), or any mixture of such gases.

The method is carried out preferably in the absence of a gas flow that transports the spray from the inlet (for example, at the bottom) of the reactor. The laminar flow to carry the material into the area with the highest temperature is best created by the suction end only (for example, the top) of the reactor, producing a depression, for example of the order of several pascals or tens of pascals.

Such embodiment allows the use of a reactor without a gas inlet in its lower part, which limits process disturbances and losses, and maximizes the efficiency of the process and the size distribution of the particles obtained.

In another embodiment, the reactor in which the method is carried out also comprises an inflow of gas at the level where the spray is formed. The gas entering the reactor at this level is preferably air, in particular, hot air, that is to say at a temperature of 80 to 200° C.

Preferably, the method according to the invention does not include any further heating step in addition to those carried out within the aerosol pyrolysis reactor.

Figure 1:
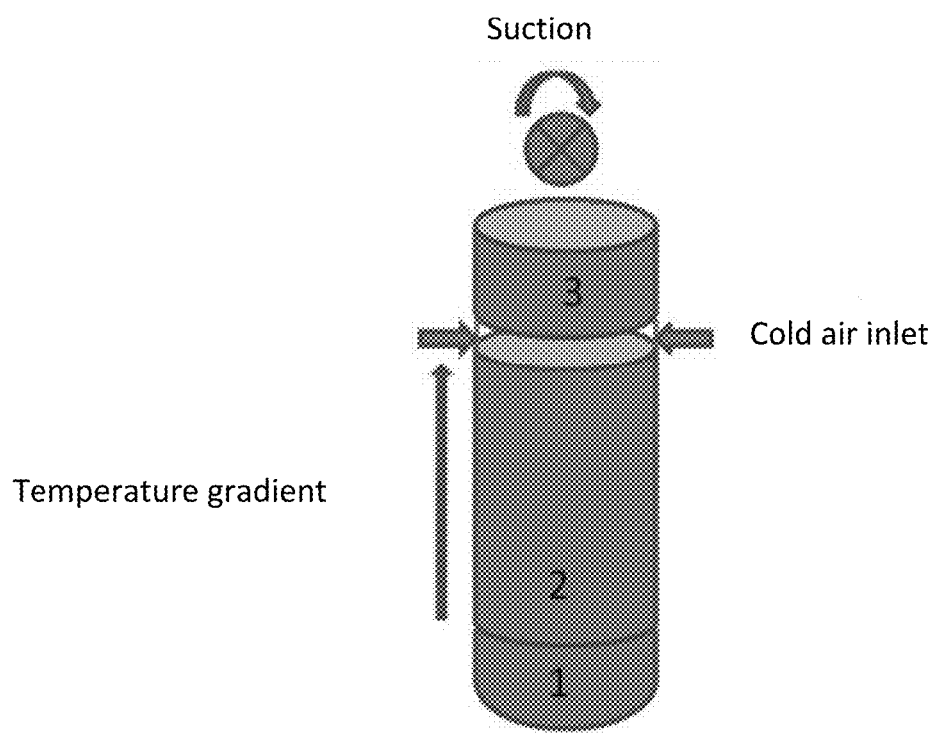
FIG. 1: Schematic representation of a reactor suitable for process implementation according to the invention.

FIG. 1 shows an example of a reactor for the implementation of the process according to the invention. The lower part (1) of the reactor comprises the liquid solution containing a precursor to one or more inorganic material(s), from which the particles are to be formed, at a given molar concentration in a solvent This solution is nebulized in the intermediate part (2), and the droplets rise into the reactor by suction. The inflow of cold gas, particularly cold air, allows the particles to be quenched. The upper part (3) of the reactor is also operated at a cold temperature (below 100° C., for example between 15 and 50° C.).

The precursor or precursors to the inorganic material(s) that are to be used to form the particles may be of any origin. It (they) is (are) introduced in step (1) of the process as a liquid solution, especially an aqueous or hydroalcoholic solution containing the metal ions (in particular an organic or inorganic salt of the chosen metal) or as precursor molecules (such as organosilanes) or in the form of a colloidal sol (as a colloidal dispersion of nanoparticles of the metal or the oxide of the chosen metal). Preferably, the precursor or precursors to the inorganic materials is (are) introduced in step (1) of the process, as a liquid solution, especially an aqueous or hydroalcoholic solution containing the metal ions (such as an organic or inorganic salt of the chosen metal). The precursor(s) to the inorganic materials is (are) selected according to the type of particles to be formed. In a particular embodiment, this precursor is at least partially derived from waste plant or food materials, which represent bio-sourced materials. A particular example of a precursor to the inorganic material is sodium silicate produced from rice hulls. Slaughterhouse waste, such as bones, can be used as a source of calcium phosphate. Blood can be used as an iron oxide precursor, and/or seashells can be used as a source of calcium carbonate.

As specified above, according to a particular embodiment, the particles produced according to the invention are made, at least partly, of a metallic component, for example, an organic-inorganic hybrid. This component can be obtained using sol-gel technology, beginning with at least one metal molecular precursor containing one or more hydrolysable groups, optionally in the presence of at least one amphiphilic surfactant (or specific texturing agent), the surfactant being optionally preserved.

The method used according to the invention allows particles with a high degree of purity to be obtained. These particles do not always require further treatment steps, such as washing, heat treatment, grinding, etc., to be carried out before they are used.

In the method of the invention, all the materials introduced into the reactor are converted. This has the advantage of generating only small amounts of waste. In addition, the utilization rate of the atoms is high and meets the requirements of green chemistry.

The method carried out according to the invention may include at least one stage of post-treatment of the particles. The post-treatment might be washing with a suitable solvent, a contact stage in a reducing environment, an encapsulation stage within the particles, heating of the particles, and/or coating of the particles, in particular for the "sealing" of the said particles.

In particular, a post-treatment phase by heating of the particle may be necessary to optimize the particle properties such as their composition or crystal structure. Generally, a post-treatment phase by heating of the particles will not be required because the velocity of the droplets and the particles in the reactor will be reduced.

The method used according to the invention allows precise control of the size of particles produced. This is because, when the concentrations of precursors are molar, which is usually the case, there is a constant ratio of about five between the diameter of the droplets in the spray and that of the particles produced by the process. The skilled worker will know how to determine the ratio between these two diameters based on the precursor concentration. For example, if the precursor concentration is reduced by a factor of 10, then the size of the particles produced is reduced by the cube root of the factor of 10, which is about 3. The droplet diameter can also be controlled by varying the process parameters while in nebulizing mode, for example, varying the frequency of the piezoelectric setting used to form the spray.

In one embodiment, at least some of the droplets are, in addition to the main component used to form the particles, made of at least one component, known as the 'sacrificial component', which may either be dissolved in a solvent such as water, acidic or alkaline water, or is a heat-sensitive component, in particular this 'sacrificial component' has the property of being vaporized or degraded at the operational temperature of the reactor. When the sacrificial component is dissolved in a solvent, the method advantageously includes a post-treatment stage where the particles are washed with the solvent. The presence of the 'sacrificial component' in the droplets allows particles to be obtained which have properties such as size, porosity, and specific surface area, that different from those of the particles obtained directly from the droplets themselves. The sacrificial compound can be any liquid, solid or gaseous chemical that has the desired properties, such as the properties of solubility and/or temperature sensitivity.

The method carried out according to the invention may comprise a step of encapsulation within inorganic particles of other entities such as organic molecules, in which case they will be organic-inorganic hybrid particles or inorganic compositions particularly in the form of nanoparticles. This encapsulation can be achieved either during the synthesis of the particles or by post-processing.

Another object of the invention is a set of particles that can be prepared according to the process defined above, in particular through the implementation of the method comprising or consisting of steps (1) to (5), as set-out above. Particles prepared according to such a method have the characteristics described above. In particular, this method allows individualised micrometric spherical particles to be obtained with the specific surface areas as described above. Preferably, this method also ensures that each particle does not comprise an aggregation of several other smaller particles. Preferably, the particles obtained by this method are individualised and non-deformable.

A final object of the invention is a process for the preparation of a material according to the invention, comprising contacting a matrix as defined above with at least one set of particles according to the invention. Preferably, the method further comprises a material forming step, as described above.

Unless otherwise stated, the percentages mentioned herein are percentages by weight. The following examples are included for illustrative purposes only and do not limit the present invention.

EXAMPLES

Unless otherwise stated, in the present examples, the measurements of specific surface area, pore volume and pore diameter have been made using the BET or BJH methods. LASER particle size measurements were made, using a Mastersizer 2000 LASER granulometer (Malvern Instruments), on dispersions of particles in water.

Example 1

Mesoporous Silica Particles

Example 1.1

Mesoporous Silica Particles with In-Situ Encapsulation of Organic Compounds

Mesoporous silica particles, encapsulating organic molecules, were prepared from two different precursors: commercial silica sol, comprising particles of diameter 10 to 30 nm, and TEOS (tetraethylorthosilicate).
a) Using the Silica Sol
51 ml of commercial silica sol mixed with 238 ml of demineralized water are prepared. The organic compound is introduced at a concentration of 50% by weight, relative to the weight of silica.
The "precursor" solution is atomized using the spray pyrolysis process.
The maximum temperature of the oven where the drying, pyrolysis and densification take place, is set to 250° C.
b) Using TEOS
145 ml of demineralized water, with a pH adjusted to 1.4 using a strong acid (HCl or $HNO_3$ for example) and 23 ml of TEOS (tetraethylorthosilicate) are introduced into a 500 ml beaker, and the mixture is stirred for 3 hours. The organic compound is introduced up to a concentration of 50% by weight, based on the weight of silicate.
The precursor solution is atomized using the spray pyrolysis process. The maximum temperature of the oven where the drying, pyrolysis and densification take place, is set to 250° C.

Example 1.2

Figure 2:
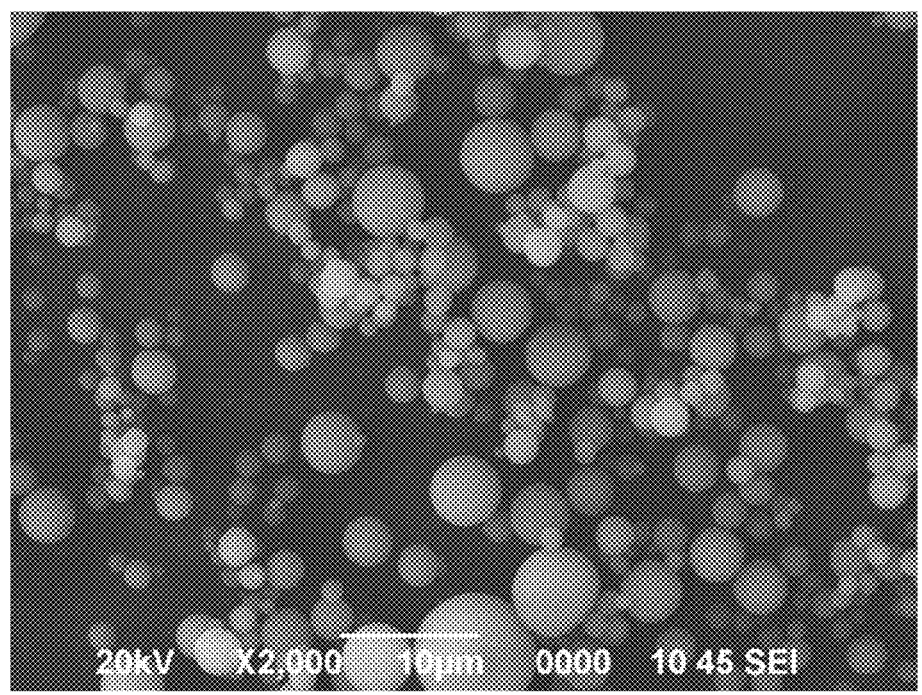
FIG. 2: SEM (Scanning Electron Microscopy) image of mesoporous silica particles according to the invention.
Figure 3A:
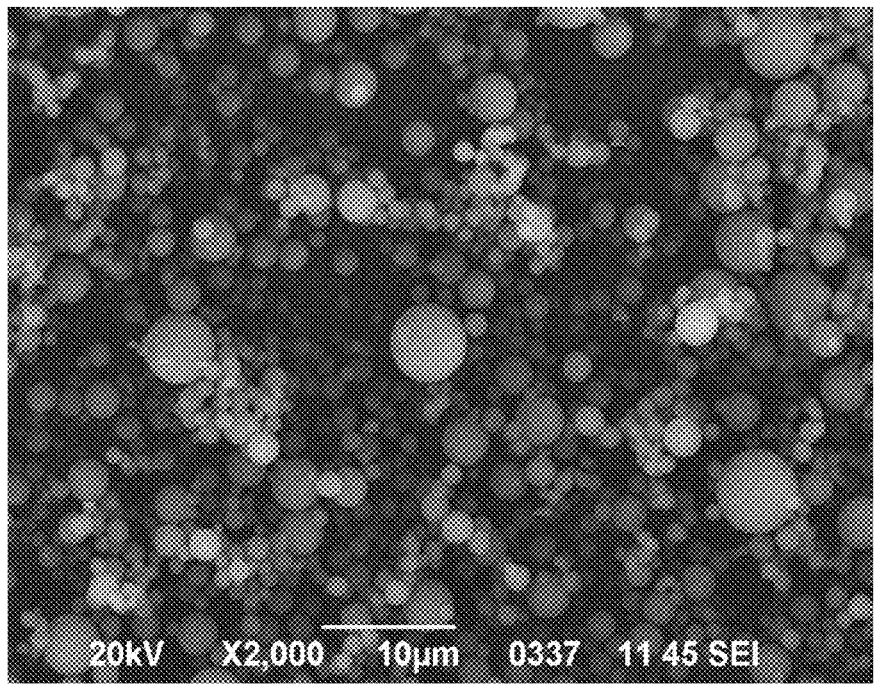
FIG. 3: SEM (Scanning Electron Microscopy) images of particles of mesoporous boehmite according to the invention (FIGS. 3a, 3b, 3c, 3d).
Figure 3B:
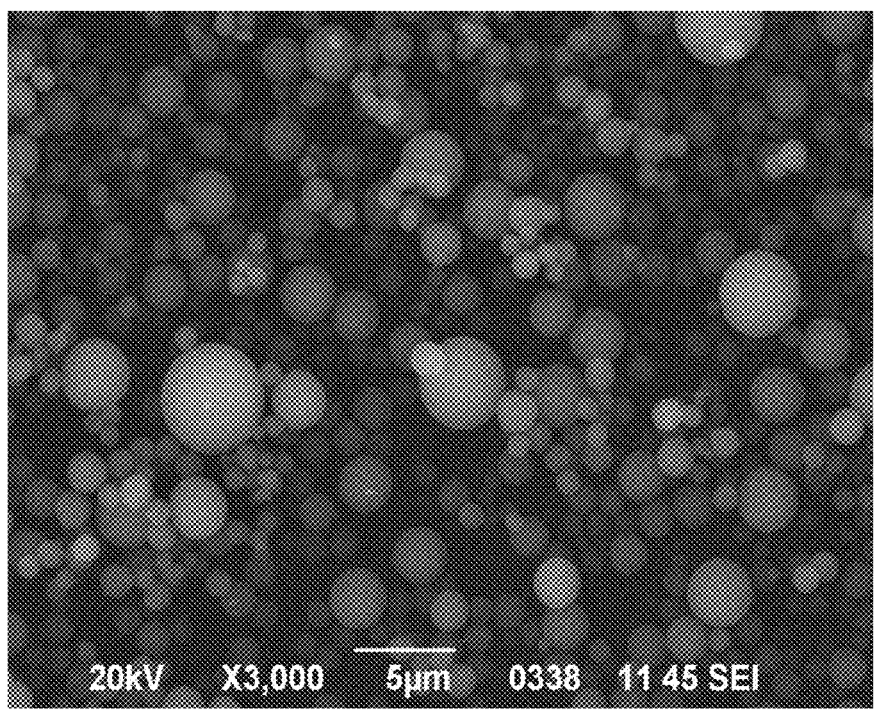
Figure 3C:
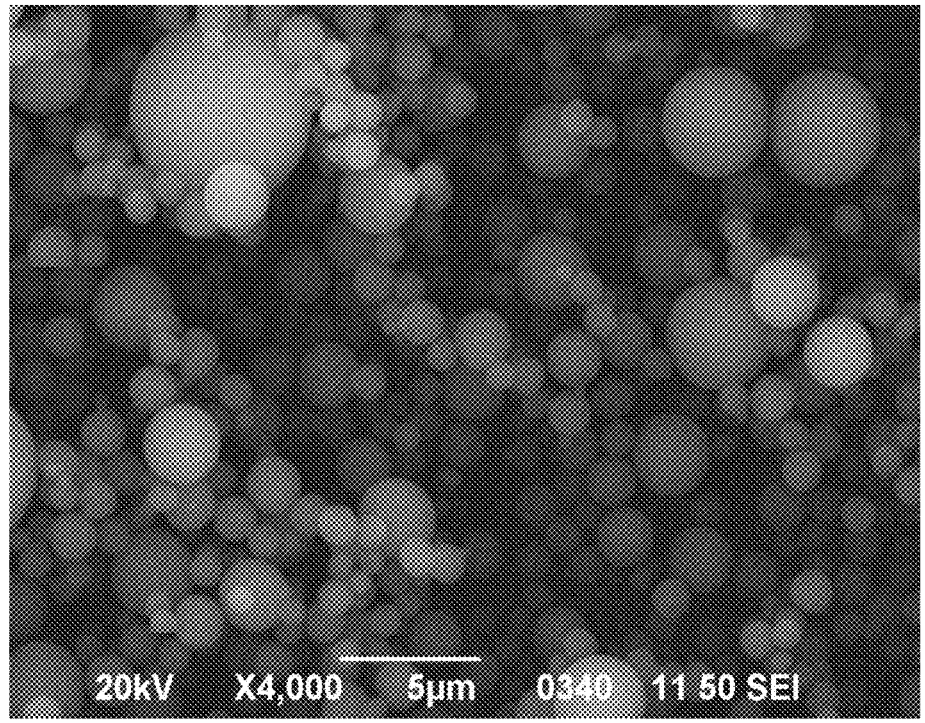
Figure 3D:
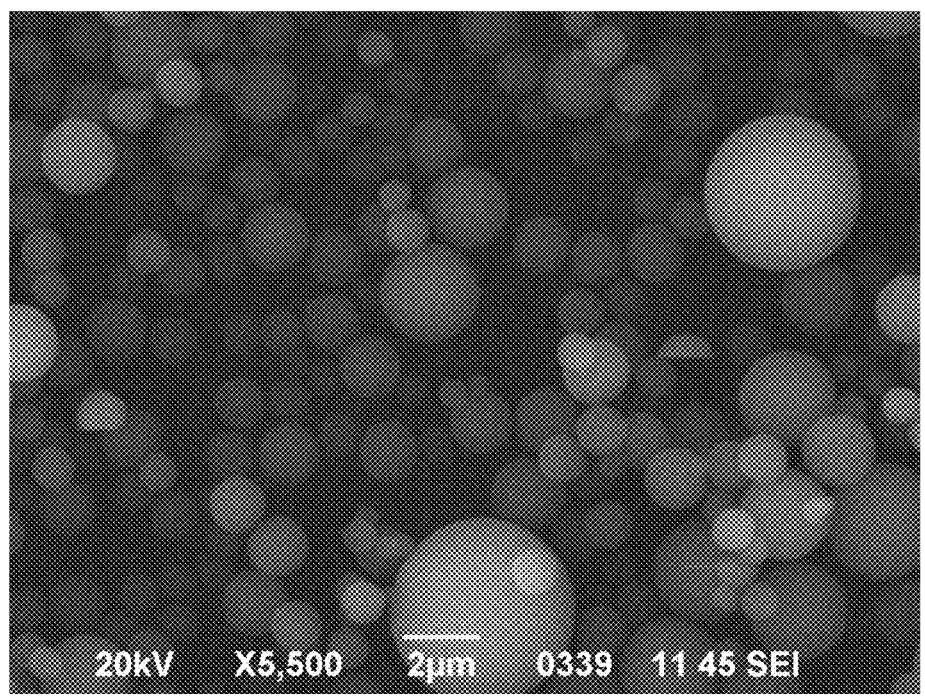

Mesoporous Silica Particles with Encapsulation of Organic Molecules in Post-Processing 25 g of mesoporous silica particles obtained using the spray pyrolysis process according to the invention (specific surface area 124 $m^2/g$ (BET), average diameter 1.2 microns (laser particle size) are introduced into a 500 ml flask connected to a vacuum outlet. The medium is heated at 140° C. under vacuum for 6 hours.
400 ml of a concentrated solution of the organic composition (25 g) are then introduced, and the mixture is stirred vigorously for 12 hours.
The particles are then centrifuged, and air dried.
The loading rate is determined by weight difference and is of the order of 50% by weight.
A SEM (scanning electron microscopy) image of mesoporous silica particles obtained in Example 1.1a is presented in FIG. 2. Similar particles were obtained in Examples 1.1b and 1.2. The LASER particle size analysis provided the following results: d50=1.72 μm. The BET specific surface area of the particles thus obtained is 122 $m^2/g$.

Example 2

Mesoporous AlOOH Boehmite Particles

The particles were synthesized using the method below.
1—Heat 300 ml of water at 80° C.

2—While the temperature is rising (to 60° C.), add the alkoxide of aluminium at 0.7M (i.e. 42.9 g) and stir vigorously.
3—Cover and stir for one hour at 80° C.
4—After an hour, add 2.6% by weight (i.e. 1.11 g) of nitric acid.
5. Cover and stir for two hours at 80° C.

The precursor solution is atomized using the spray pyrolysis process (SP100) carried out according to the invention. The maximum temperature reached in the reactor, where the drying, pyrolysis and densification take place, is 500° C.

FIG. 3 shows SEM photographs of the boehmite particles thus obtained. X-ray diffraction analysis allowed the identification of orthorombic boehmite. The BET specific surface area of the powder is 402 m$^2$/g, and the average pore diameter (BET) is 3 nm. The LASER particle size analysis yielded the following values: d10=0.76 μm, d50=1.09 μm, and d90=1.8 μm.

Example 3

Preparation of Hollow CuO Particles

An aqueous solution is prepared using 241 g of Cu(NO$_3$)$_2$, 3H$_2$O copper nitrate trihydrate powder, dissolved in 1 l of water.

The precursor solution is atomized using the spray pyrolysis process. The maximum temperature of the oven, where the drying, pyrolysis and densification take place, is set to 800° C.

The particles are then heat treated, in an air-drying oven for 2 hours at 500° C. in order to finalize the decomposition of the nitrates which remains incomplete at the reactor outlet.

Figure 4A:
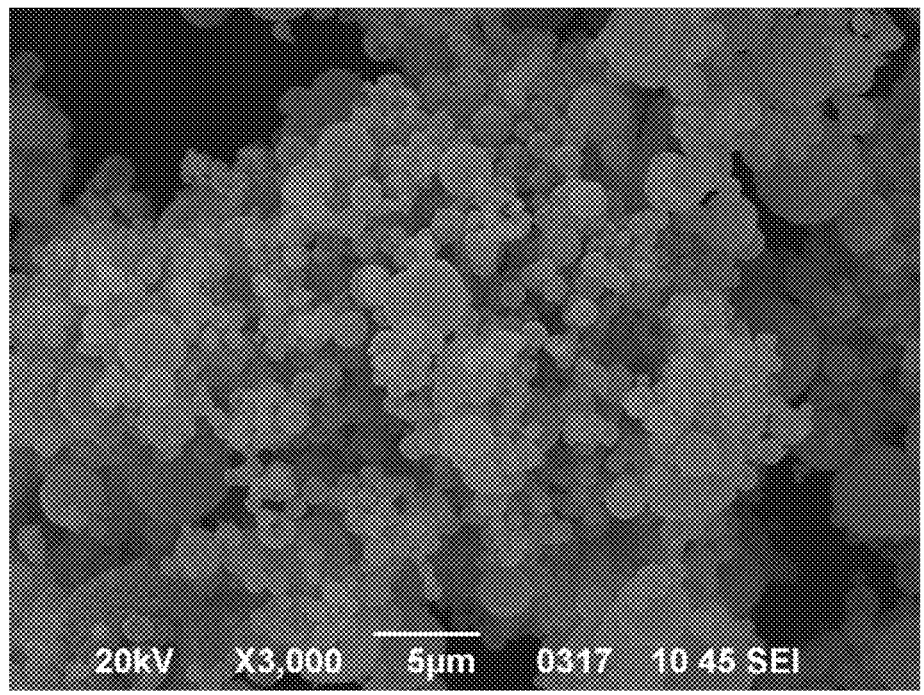
FIG. 4: SEM (Scanning Electron Microscopy) images of hollow copper oxide particles according to the invention (FIGS. 4a, 4b, 4c).
Figure 4B:
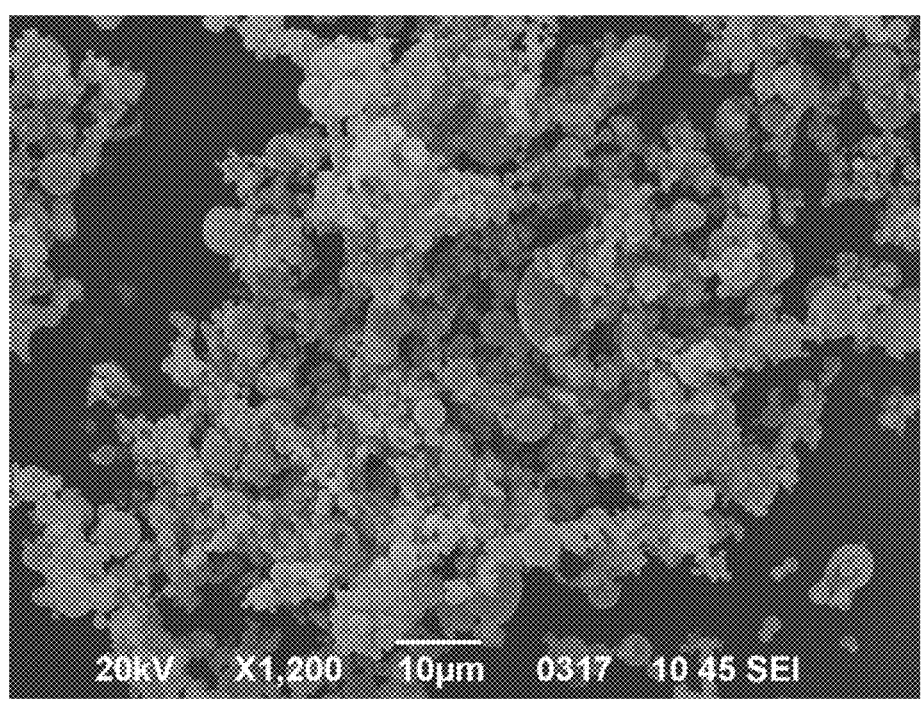
Figure 4C:
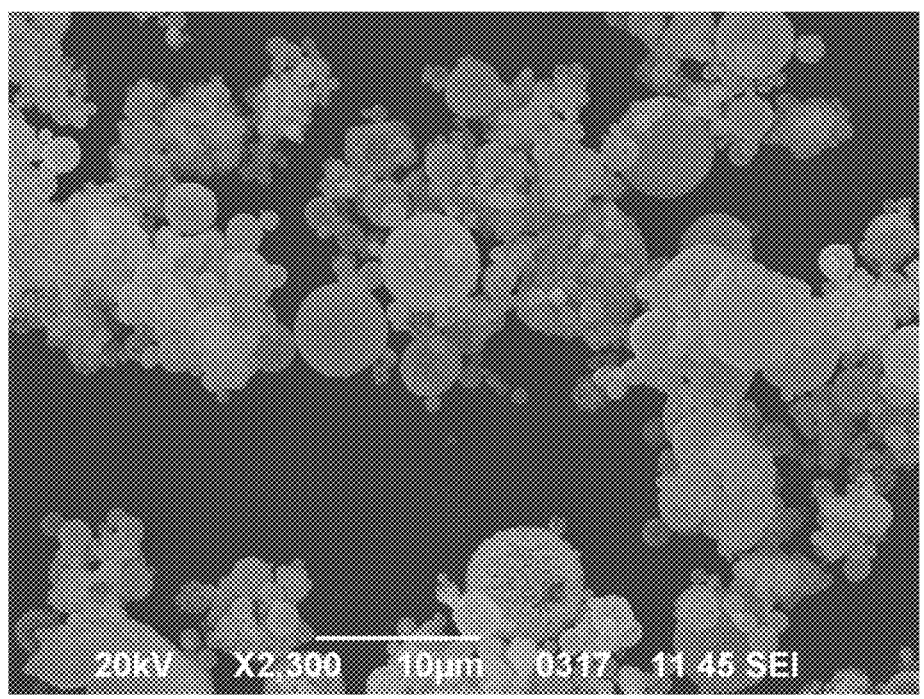

FIG. 4 shows SEM images of CuO particles thus obtained. X-ray diffraction analysis allowed the identification of monoclinic CuO. The LASER particle size analysis yielded the following values: d10=0.416 μm, d50=0.700 μm, and d90=0.999 μm.

Example 4

Preparation of Hollow Metallic Copper Particles

The CuO powder obtained in Example 3 is placed inside an oven. A flow of reducing gas (for example, 5% H$_2$, 95% N$_2$) is circulated in the oven throughout the reaction. The reduction takes place over a period of 3 hours at a temperature of 500° C.

X-ray diffraction analysis showed that all particles thus obtained are copper particles.

Example 5

Mesoporous Al$_2$O$_3$ Alumina Particles

The particles were prepared using the method below.
1—Heat 300 ml of water at 80° C.
2—While the temperature is rising (to 60° C.), add the alkoxide of aluminium at 0.7M (i.e. 42.9 g) and stir vigorously.
3—Cover and stir for one hour at 80° C.
4—After an hour, add 2.6% by weight (i.e. 1.11 g) of nitric acid.
5. Cover and stir for two hours at 80° C.

The precursor solution is atomized using the spray pyrolysis process according to the invention. The profile of maximum temperatures reached in the reactor where the drying, pyrolysis and densification take place, is 350° C., 600° C., and 800° C.

Figure 5A:
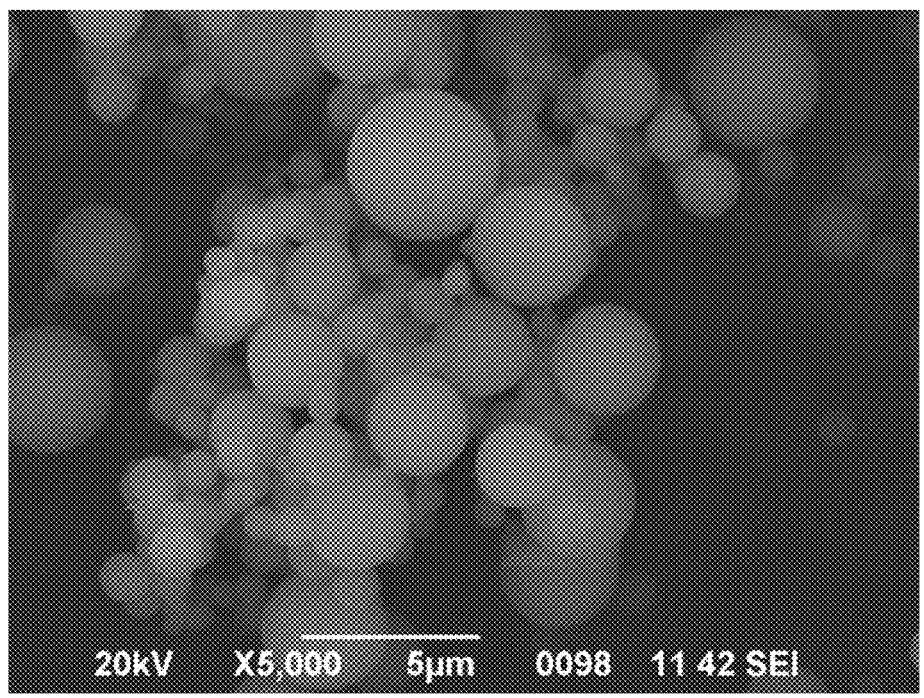
FIG. 5: SEM (Scanning Electron Microscopy) images of mesoporous alumina particles according to the invention (FIGS. 5a, 5b, 5c).
Figure 5B:
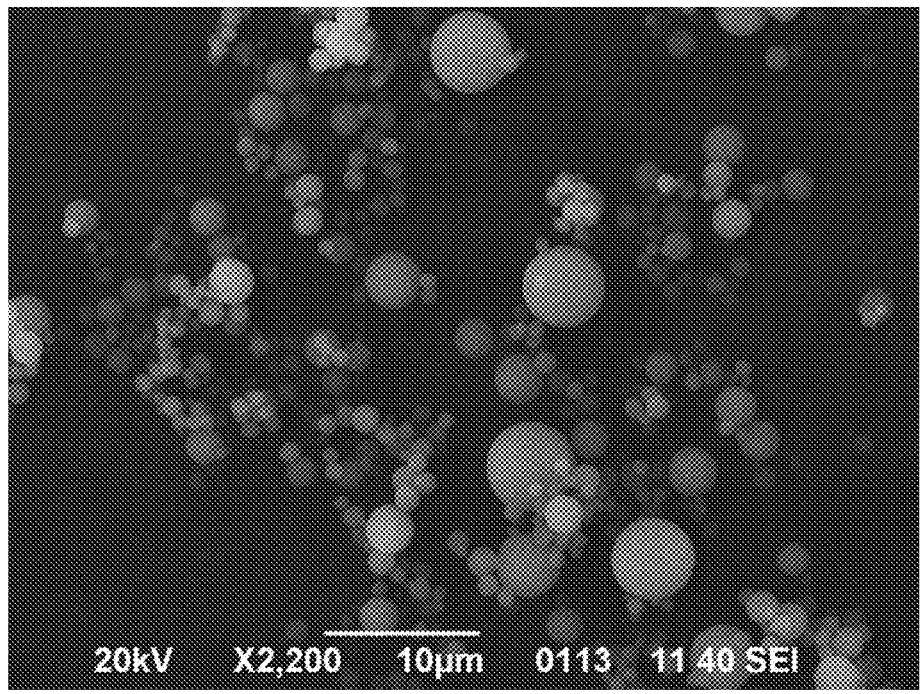
Figure 5C:
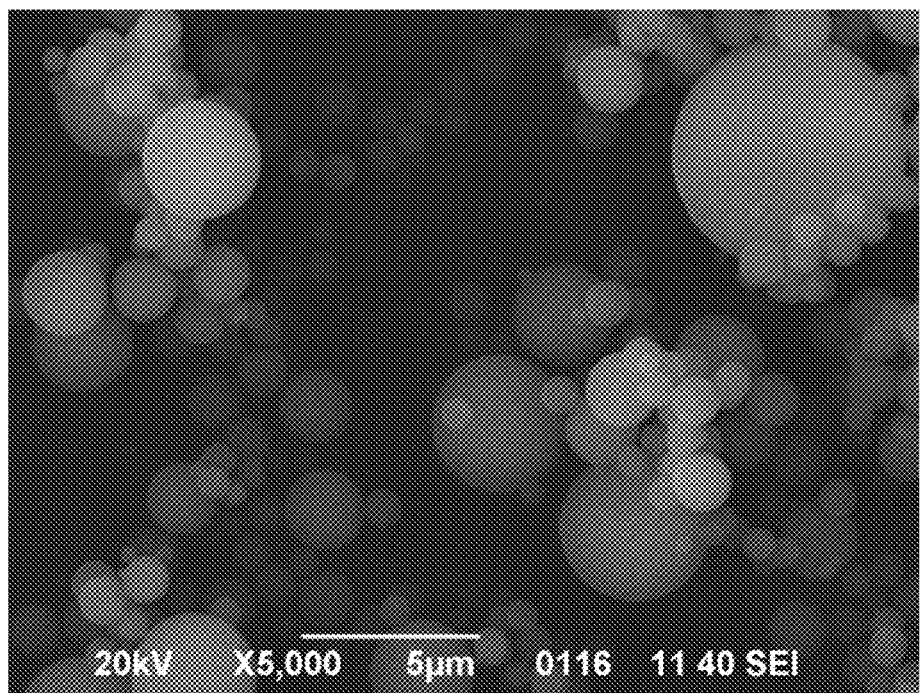

FIG. 5 shows SEM images of the particles of Al$_2$O$_3$ obtained. X-ray diffraction analysis allowed the identification of amorphous Al$_2$O$_3$. The BET specific surface area of the powder is 383 m$^2$/g, and the average pore diameter is 2.4 nm. The LASER particle size analysis provided the following values: d10=0.95 μm, d50=1.33 μm and d90=2.26 μm.

Example 6

Mesoporous SiO$_2$/TiO$_2$ Mixed Particles

Silica Sol

In a beaker, 627 ml of demineralized water are introduced with 8 g of a surfactant (poloxamer such as Pluronic, CTAB (hexadecyltrimethylammonium bromide) or a derivative of Brij products, polyoxyethylene for example). After the dissolution of the surfactant, 28 g of TEOS are added, in one lot, while stirring continuously. The mixture is stirred vigorously for 15 hours to allow hydrolysis and condensation of TEOS to take place, and, thus, the formation of the silica gel.

The Titanium Oxide Sol

In parallel, a volume of 1.5 ml of nitric acid is introduced into a flask containing 100 ml of demineralized water. The solution is heated at 70° C., and 17 g of titanium butoxide are added. The reaction is carried out under vigorous stirring for a period of 12 hours, to allow the synthesis of the titanium oxide nanoparticles. The dispersion is left to be decanted for a period of two hours to allow the removal of butanol from the surface.

Spray Pyrolysis

The titanium sol is introduced into the silica sol, and the mixture stirred magnetically for five minutes.

The precursor solution is atomized using the spray pyrolysis process according to the invention. The maximum temperature of the oven, where the drying, pyrolysis and densification take place, is set to 500° C.

Post Treatment

The particles are then heat treated, in an air-drying oven for 4 hours at 700° C. The method is repeated by varying the amount of TiO$_2$, to obtain three samples: SITI_01, SITI_02 and SITI_03 (see Table 1 below).

TABLE 1

| Reference | TEOS weight | Titanium butoxide weight | Weight ratio TiO$_2$/SiO$_2$ | BET specific surface area | Specific surface area BJH | Porous volume BJH | Porous volume BET | Diameter average of pores BET |
|---|---|---|---|---|---|---|---|---|
| SITI_01 | 28 g | 17.0 g | 0.48 | 563 m$^2$/g | 581 m$^2$/g | 0.45 cm$^3$/g | 0.45 cm$^3$/g | 3.2 nm |
| SITI_02 | 28 g | 22.4 g | 0.65 | 518 m$^2$/g | 614 m$^2$/g | 0.41 cm$^3$/g | 0.45 cm$^3$/g | 3.5 nm |
| SITI_03 | 28 g | 11.2 g | 0.32 | 595 m$^2$/g | 544 m$^2$/g | 0.37 cm$^3$/g | 0.46 cm$^3$/g | 3.0 nm |

Figure 6A:
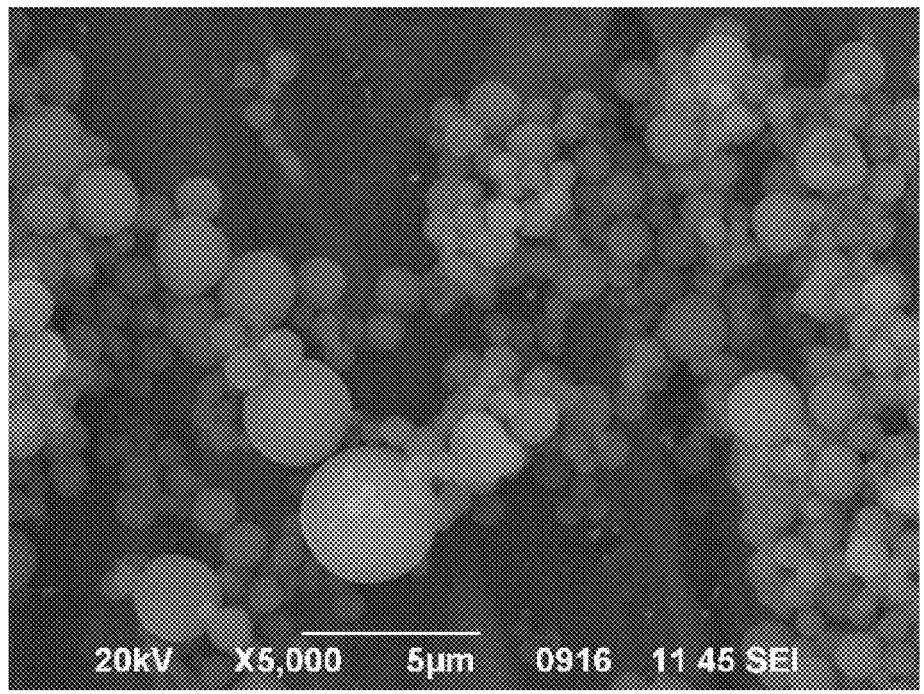
FIG. 6: SEM (Scanning Electron Microscopy) images of mesoporous mixed $SiO_2/TiO_2$ particles according to the invention: SITI_01 (FIG. 6a), SITI_02 (FIG. 6b) and SITI_03 (FIG. 6c).
Figure 6B:
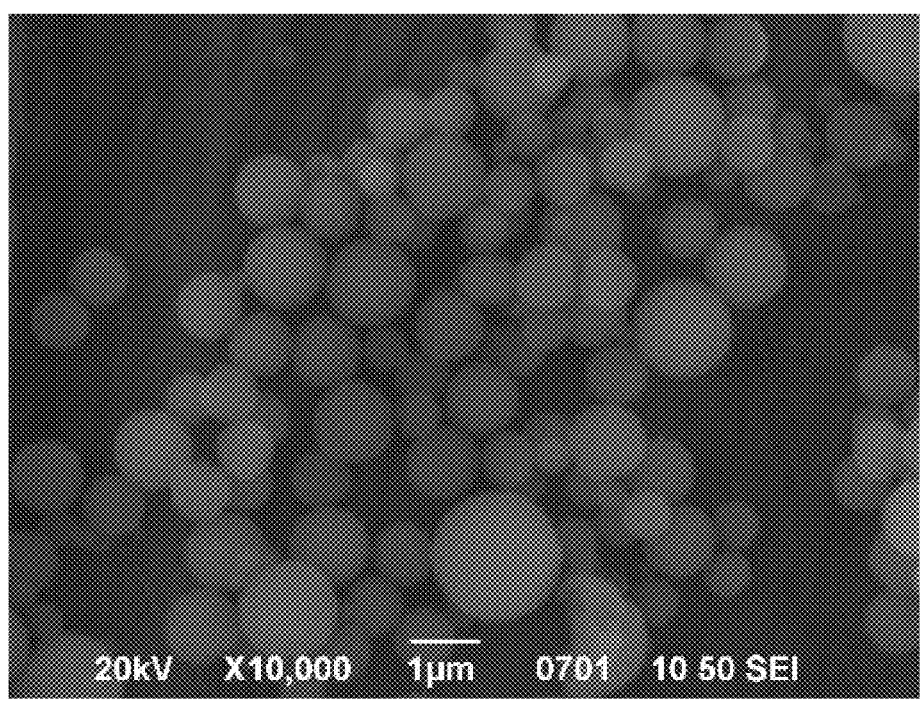
Figure 6C:
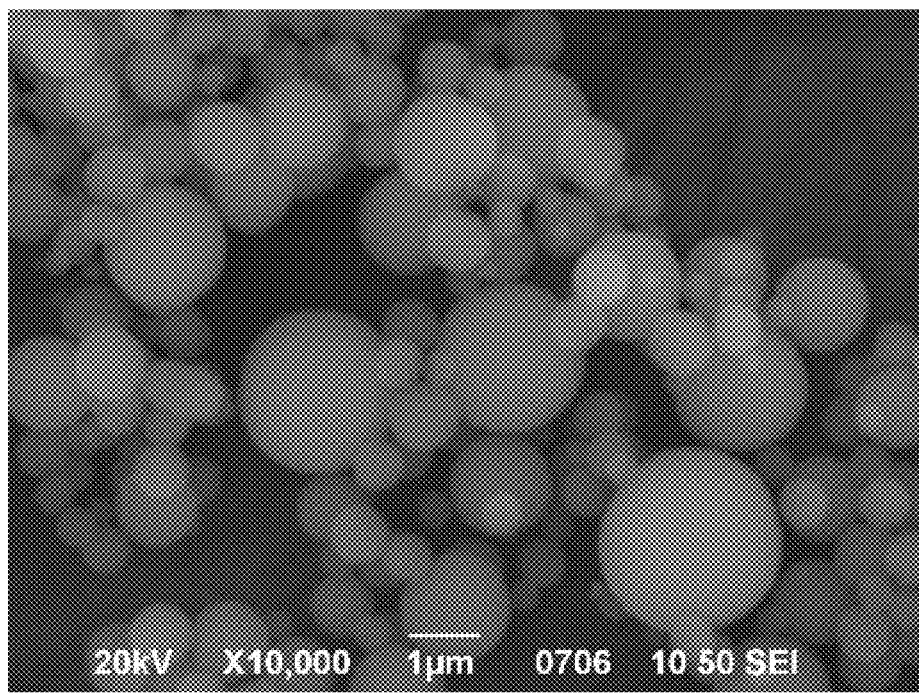

FIG. 6 shows SEM images of the particles obtained: SITI_01 (a) SITI_02 (b) and SITI_03 (c).

Table 2 below summarizes the properties of the three samples obtained.

TABLE 2

| Reference | Average diameter | Laser granulometry diameter (number) | BET specific surface area | BJH specific surface | Average pore diameter | XRD of $TiO_{2\ phase}$ (amorphous $SiO_2$) |
|---|---|---|---|---|---|---|
| SITI_01 | 1.1 μm ± 0.6 μm | d10 = 0.52 μm<br>d50 = 0.78 μm<br>d90 = 1.60 μm | 563 m$^2$/g | 581 m$^2$/g | 3.2 nm | Rutile/brookite |
| SITI_02 | 2.0 μm ± 0.5 μm | d10 = 0.49 μm<br>d50 = 0.73 μm<br>d90 = 1.48 μm | 518 m$^2$/g | 614 m$^2$/g | 3.5 nm | Rutile/brookite |
| SITI_03 | 1.8 μm ± 1.1 μm | d10 = 0.53 μm<br>d50 = 0.79 μm<br>d90 = 1.64 μm | 595 m$^2$/g | 544 m$^2$/g | 3.0 nm | Rutile/brookite |

The values of the average diameters are obtained by a statistical study of electronic microscopy images.

Example 7

Other Types of Particles

Figure 7A:
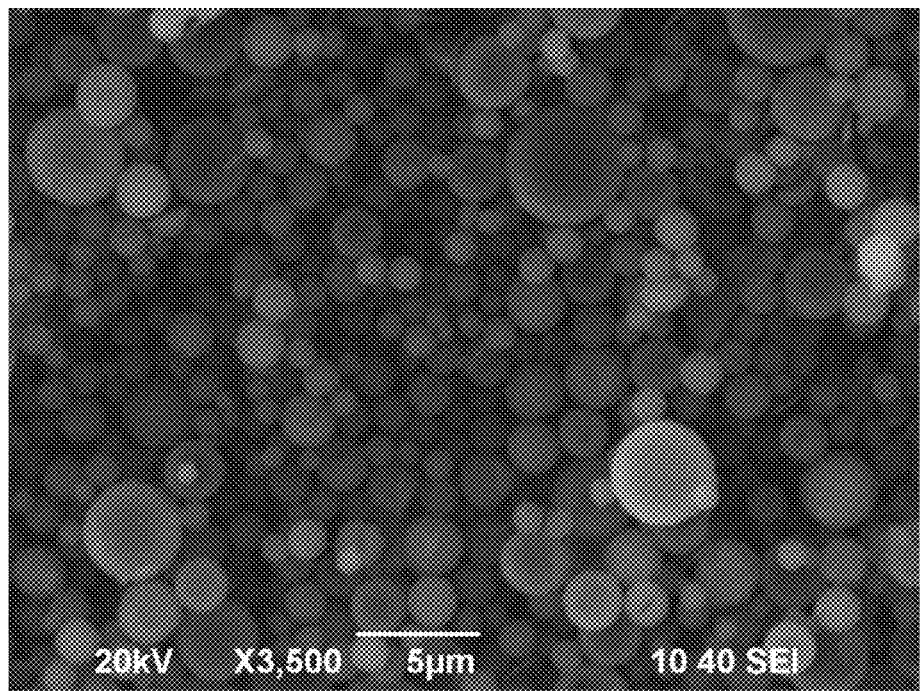
FIG. 7: SEM (Scanning Electron Microscopy) images of hollow alumina particles according to the invention (FIGS. 7a and 7b).
Figure 7B:
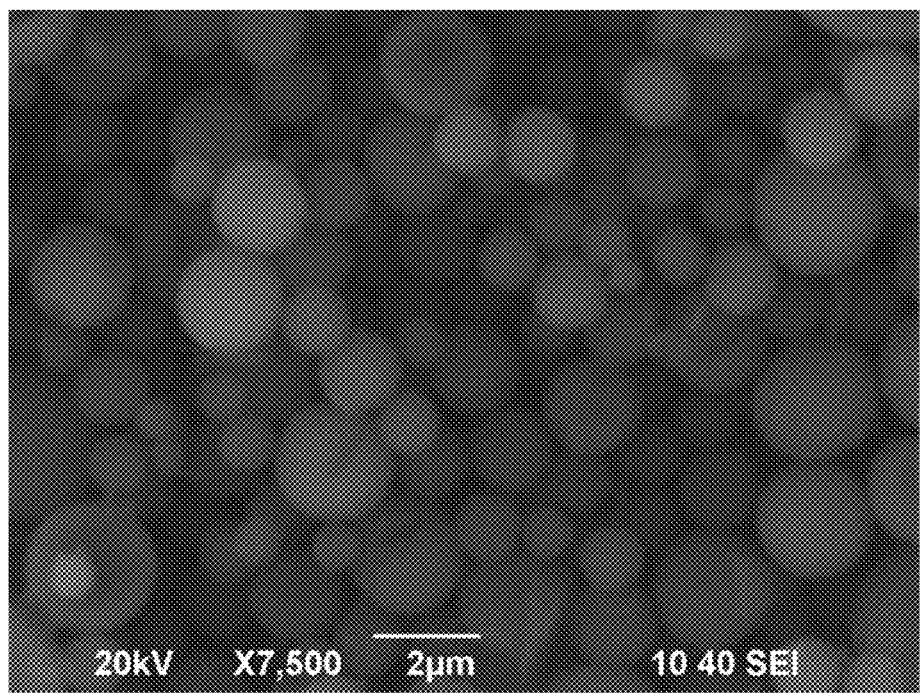
Figure 8A:
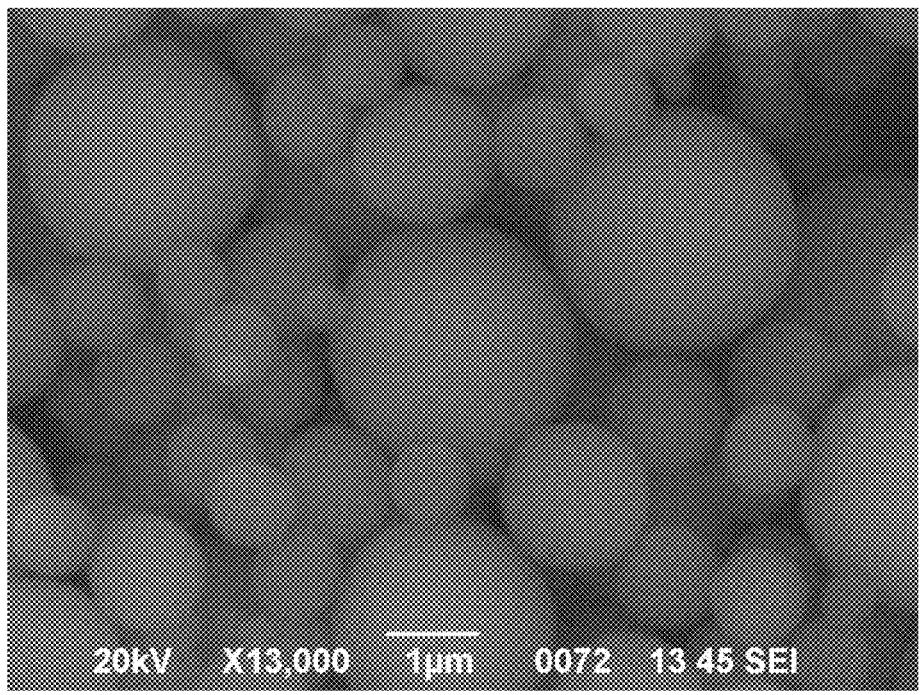
FIG. 8: SEM (Scanning Electron Microscopy) images of dense silica particles according to the invention (FIGS. 8a and 8b).
Figure 8B:
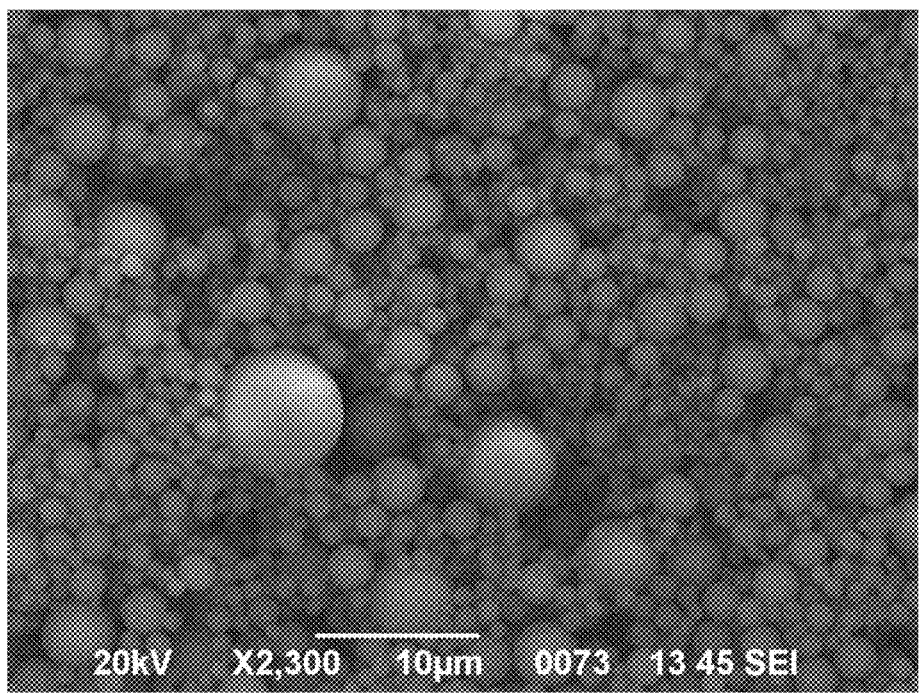
Figure 9:
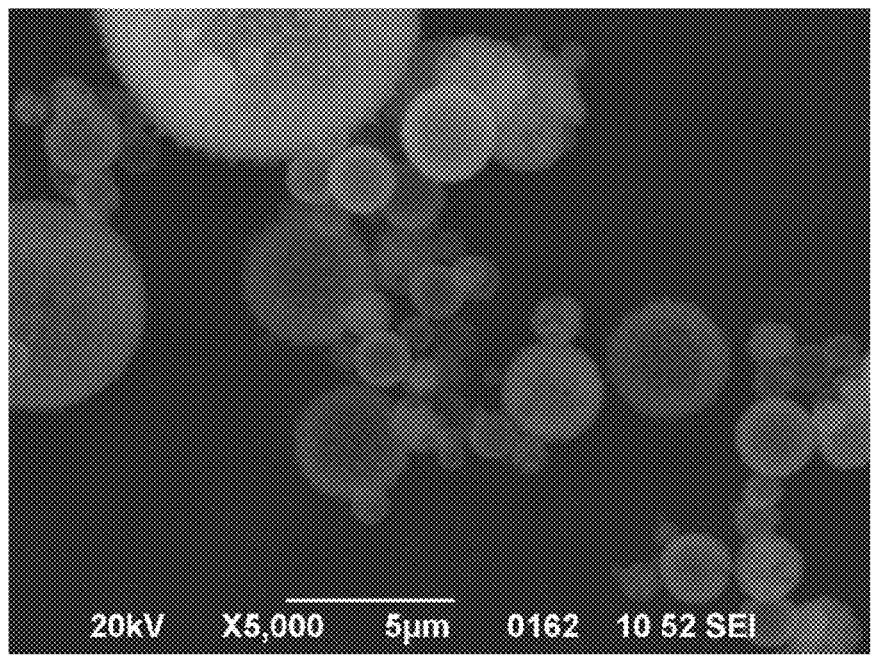
FIG. 9: SEM (Scanning Electron Microscopy) image of hollow magnesium oxide particles according to the invention.

Other particles were prepared and characterized according to the invention. For example, FIGS. 7 to 9 show Electron Microscopy Scanning images of particles according to the invention:
- hollow alumina particles (FIG. 7)
- dense silica particles (FIG. 8), and
- hollow magnesium oxide particles (MgO) (FIG. 9).

Table 3 below shows examples of different types of synthesized particles according to the invention.

The elements with the signs ":" in the particle name in Table 3 are particles with dopants.

The term "Bio-$SiO_2$" refers to a bio-based silica made from sodium silicate which can be obtained by extraction of plant food waste.

TABLE 3

| | Size (μm) | Morphology | Crystalline phase |
|---|---|---|---|
| h-ZnO | 0.5 | dense | Hexagonal |
| h-ZnO:Al | 1 | hollow | hexagonal |
| h-ZnO:Al | 5 | hollow | hexagonal |
| $Al_2O_3$ | 1.2 | hollow | amorphous |
| γ-$Al_2O_3$ | 1.2 | hollow | cubic |
| α-$Al_2O_3$ | 1.5 | hollow | rhomboedric |
| $SiO_2$ | 1.9 | dense | amorphous |
| $SiO_2$ | 1.2 | meso | amorphous |
| O—AlOOH | 1.1 | meso | orthorombic |
| C—CuO | 0.7 | hollow | Cubic |
| Anatase-$TiO_2$ | 0.8 | meso | mixture anatase rutile |
| Rutile-$TiO_2$ | 1 | meso | quadratic |
| $Al_2O_3$ | 1.1 | meso | amorphous |
| γ-$Al_2O_3$ | 1.4 | meso | cubic |
| α-$Al_2O_3$ | 1.2 | dense | rhomboedric |
| $SiO_2TiO_2$ | 1.3 | meso | Anatase |
| m-MMTHPS = Montmorillonite ((Na, Ca)$_{0.3}$(Al, Mg)$_2$Yes$_4O_{10}$(OH)$_2$·NH 2 O) | 1 | meso | monoclinic |
| h-LDHMG63HT = hydrotalcite (magnesium aluminum hydroxy carbonate) | 1 | meso | Hexagonal |
| h-Mg(OH)$_2$ | 0.7 | meso | hexagonal |
| h-ZnO:Al | 1 | meso | hexagonal |
| C—MgO | 1.9 | hollow | cubic |
| Q-$ZrO_2$ | 0.4 | hollow | quadratic |
| Q-$ZrO_2$ | 0.6 | dense | quadratic |
| h-ZnO:Al | 1 | hollow | hexagonal |
| h-ZnO:Al | 1 | hollow | hexagonal |
| C_$Y_2O_3$ | 0.6 | hollow | Cubic |
| C—MgO | 1.9 | hollow | cubic |
| C—$Y_2O_3$:Eu | 0.5 | hollow | Cubic |
| C_$Y_2O_3$:Er:Eu:Yb | 0.6 | hollow | cubic |
| C—$CeO_2$ | 0.7 | hollow | Cubic |
| YSZ = Yttria-stabilized zirconia | 0.7 | hollow | quadratic |
| YSZ = Yttria-stabilized zirconia | 0.6 | dense | quadratic |
| C—CCTO = $CaCu_3Ti_4O_{12}$ | 0.3 | dense | Cubic |
| Bio-$SiO_2$ | 1 | meso | amorphous |
| Q-$ZrO_2$ | 0.6 | meso | quadratic |
| c-$BaTiO_3$ | | Unmeasured | Cubic |
| α-$Fe_2O_3$ | 1 | dense | hematite |
| O—MgSO4 | 1.5 | hollow | orthorombic |
| C—ZMFO ($Zn_{0.18}Mn_{0.82}Fe_2O_4$) | 1.5 | dense | Cubic |
| M—$Mn_2P_2O_7$ | 0.8 | dense | monoclinic |
| NiMnOxide | 0.8 | dense | mixture |
| Mullite ($SiO_2$, $Al_2O_3$) | | hollow | Unmeasured |
| $Fe_3O_4$ | Unmeasured | Unmeasured | Unmeasured |
| $ZnFe_2O_4$ | Unmeasured | Unmeasured | Unmeasured |
| $MnFe_2O_4$ | Unmeasured | Unmeasured | Unmeasured |
| $NiFe_2O_4$ | Unmeasured | Unmeasured | Unmeasured |
| $CoFe_2O_3$ | Unmeasured | Unmeasured | Unmeasured |
| $MgAl_2O_4$ | Unmeasured | Unmeasured | Unmeasured |
| $Y_3Al_5O_{12}$ | Unmeasured | Unmeasured | Unmeasured |

The size values in Table 3 were obtained by statistical analysis of electron microscopy images. The BET specific surface area of the rutile $TiO_2$ powder obtained is 47 m$^2$/g.

The BET specific surface area of obtained anatase $TiO_2$ powder is 198 m$^2$/g. The BET specific surface area of obtained wurtzite ZnO powder (described as h-ZnO in Table 3) is 39 m$^2$/g.

Example 8

Incorporation of the Particles Obtained in Example 2 in a Polyethylene Matrix The boehmite particles obtained in Example 2 are introduced into a polyethylene matrix by extrusion compounding. The extruder is a co-rotating twin-screw Clextral model, EVOLUM HT 32, with an L/D ratio of 44 and a screw diameter of 32 mm.

The proportions used are the following: 80% polyethylene, and 20% boehmite particles, by weight. The extrusion temperature profile is as follows:

|  | F | Z11 | Z10 | Z9 | Z8 | Z7 | Z6 | Z5 | Z4 | Z3 | Z2 | Z1 |
|---|---|---|---|---|---|---|---|---|---|---|---|---|
| Setpoint temperature (° C.) | 180 | 180 | 180 | 180 | 180 | 180 | 180 | 180 | 170 | 150 | 100 | 15 |
| Real temperature (° C.) | 178 | 178 | 182 | 185 | 180 | 181 | 181 | 182 | 169 | 154 | 100 | 15 |

The screw speed is set at 250 revolutions/min, the motor torque at 44%, maximum pressure is 40 bar, material temperature is 180° C. and drying is carried out at 50° C. for 4 hours.

Figure 10:
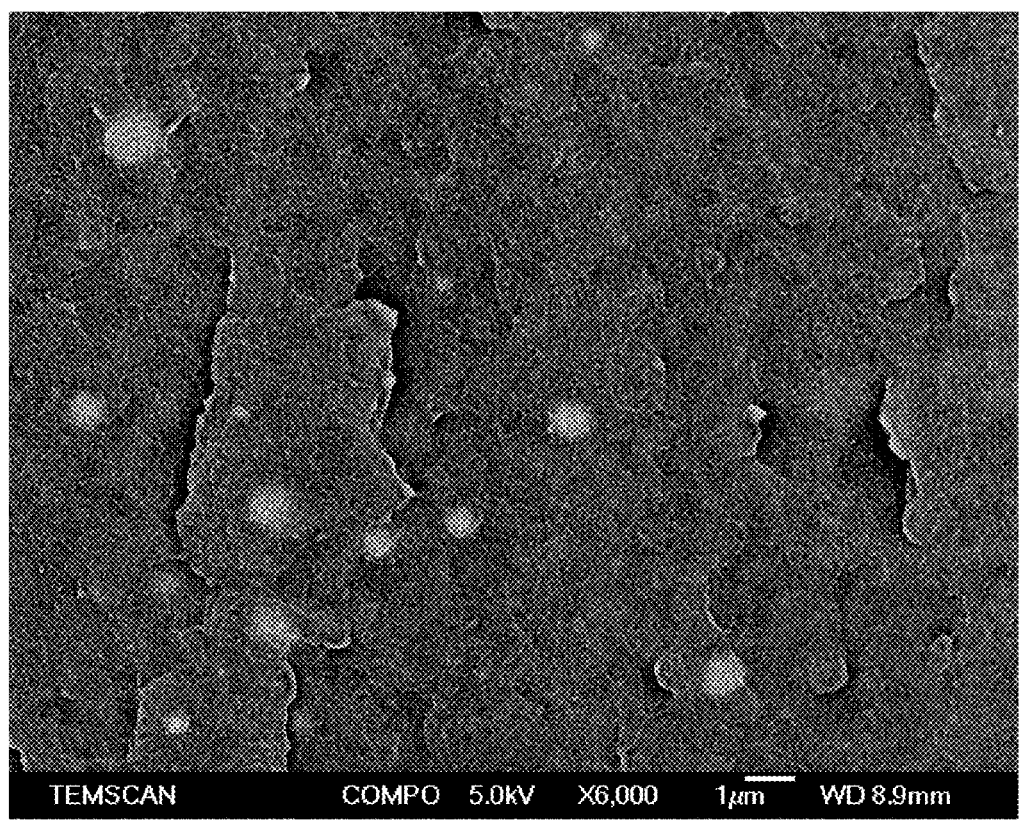
FIG. 10: SEM (Scanning Electron Microscopy) image of mesoporous boehmite particles according to the invention in a polyethylene matrix.

FIG. 10 shows SEM images of boehmite particles produced according to the invention within the polyethylene matrix.

Example 9

The Incorporation of Particles Obtained in Example 4 into a Matrix

The copper metal particles obtained in Example 4 were dispersed at 58% by weight in an aqueous matrix comprising, in particular, 13% alcohol (ethanol or ethylene glycol+ citric acid).

The method is as follows:
The surface of the copper particles is washed: the copper particles are suspended in a concentrated solution of citric acid for 24 hours at ambient temperature. The particles are then filtered and suspended in a solution of ethanol and citric acid for 24 hours at ambient temperature. The particles are filtered and dried.
The particles are mechanically dispersed in the ethanol to obtain a paste. This is mixed with the aqueous solution.
The final solution is comprised of 58%, by weight, of copper particles, 13%, by weight, of alcohol solution (for example, 90% ethanol+10% citric acid by weight) and 29%, by weight, of aqueous solution.

Example 10

Incorporation of Hollow $ZrO_2$ Particles into an Enamel Matrix

Hollow particles of $ZrO_2$ produced according to the invention were dispersed into an enamel matrix in an aqueous slurry using the following method:
1/Pre-dispersion of the hollow particles in aqueous solution: the hollow particles are suspended in an aqueous solution. The proportion of hollow particles may vary between 50% and 90% by weight of solid material.
2/Pre-dispersion of the enamel powder in aqueous solution. The proportion of enamel powder may be varied between 50% and 90% by weight of solid material.
3/The suspension of hollow particles is added to the enamel slip while the mixture is stirred mechanically. In its final form, the slurry may comprise 30% to 60% by weight of solids and 40% to 70% by weight of aqueous solution.

The resulting slurry may be sprayed onto the metal substrate. The substrate, coated with enamel is dried in air at about 100° C. and then undergoes firing at high temperature (between 800 and 1000° C.) depending on the quality of the enamel.

Figure 11:
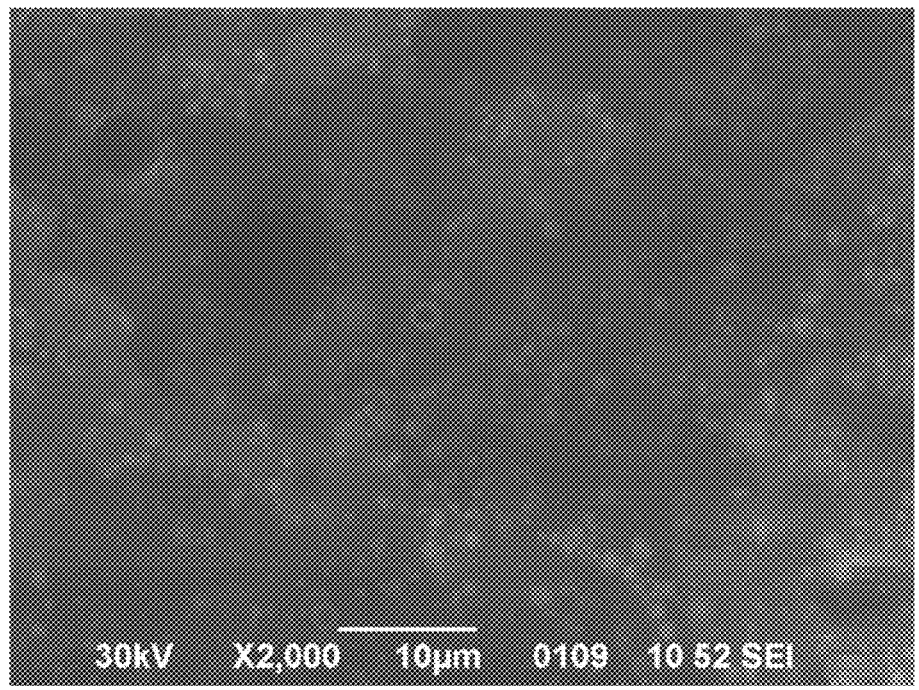
FIG. 11: SEM (Scanning Electron Microscopy) image of hollow $ZrO_2$ particles according to the invention in an enamel matrix.

FIG. 11 shows a SEM image of a dense enamel matrix containing 20% hollow particles of zirconium oxide deposited by spraying onto a steel substrate.

Example 11

Embedding of Dense ZnO Particles in an ABS Matrix

Figure 12A:
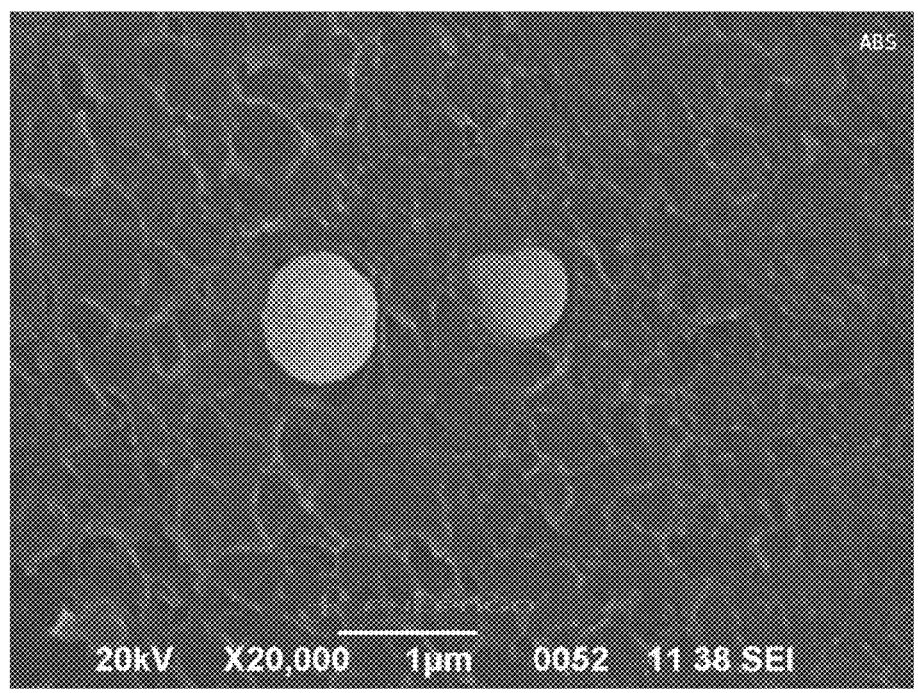
FIG. 12: SEM (Scanning Electron Microscopy) images of dense ZnO particles according to the invention in a matrix of ABS (Acrylonitrile Butadiene Styrene) (FIGS. 12a and 12b).
Figure 12B:
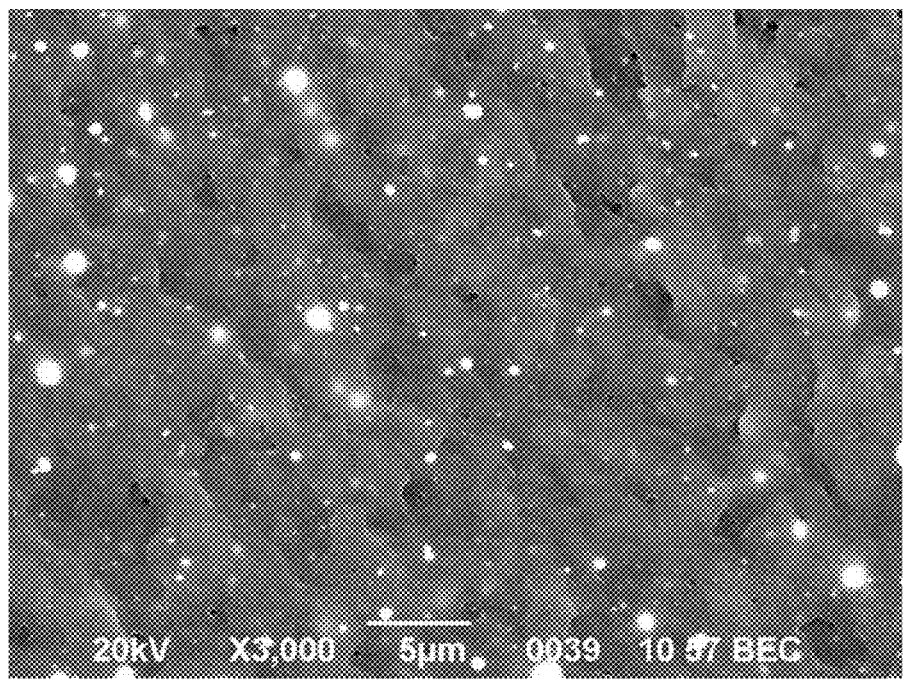

FIG. 12 is a SEM image of dense ZnO particles, produced according to the invention, incorporated in a matrix of ABS (Acrylonitrile Butadiene Styrene).

The invention claimed is:

1. A set of spherical inorganic micrometric particles, wherein the particles are individualized and have diameters of between 0.2 and 5 micrometers and specific surfaces greater than or equal to 15 m$^2$/g, and wherein the particles have a coefficient of sphericity of greater than or equal to 0.75.

2. The set of particles according to claim 1, wherein each particle is not made of an aggregate of smaller particles.

3. The set of particles according to claim 1, wherein the particles are solid or hollow.

4. The set of particles of claim 1, wherein the particles are porous, mesoporous, or non-porous.

5. The set of particles according to claim 1, wherein the particles have diameters between 0.5 and 3 micrometers.

6. The set of particles according to claim 1, wherein the particles are ZnO particles, alumina particles, boehmite particles, silica particles, copper oxide particles, titanium oxide particles, mixed titanium and silicon oxide particles, montmorillonite particles, hydrotalcite particles, magnesium dihydroxide particles, magnesium oxide particles, zirconium oxide particles, of particles of yttrium oxide $Y_2O_3$, Cerium dioxide particles, particles of zirconia stabilized with yttrium, particles of $CaCu_3Ti_4O_{12}$, particles of $BaTiO_3$, iron oxide particles, magnesium sulphate particles, particles of $Zn_{0.18}Mn_{0.82}Fe_2O_4$, $Mn_2P_2O_7$ particles, nickel manganese oxide particles, mullite particles, particles of $ZnFe_2O_4$, particles of $MnFe_2O_4$, particles of $NiFe_2O_4$, particles of $CoFe_2O_3$, particles of $MgAl_2O_4$, or particles of $Y_3Al_5O_{12}$.

7. The set of particles according to claim 1, wherein the particles are particles of MgO, ZnO, $ZrO_2$ stabilized with yttrium, Mullite ($SiO_2/Al_2O_3$), or of such particles having been doped.

8. A material comprising the set of particles according to claim 1 dispersed homogeneously within a matrix.

9. The material according claim 8, wherein the matrix is a liquid matrix.

10. The material according claim 8, wherein the matrix is a solid matrix.

11. The material according to claim 8, wherein the matrix is a solid matrix and is a thermoplastic polymer matrix.

12. A process for preparing the set of particles according to claim 1 by aerosol pyrolysis, comprising the following steps:
- nebulization of a liquid solution containing a precursor to one or more inorganic material(s), from which the particles are to be formed, at a molar concentration in a solvent, which is used to obtain a spray of droplets of the solution,
- heating of the spray to a temperature sufficient to ensure the evaporation of the solvent and the formation of particles,
- heating of the formed particles to a temperature sufficient to ensure the decomposition of the precursor to form the inorganic material,
- optionally, densification of the particles,
- optionally, quenching of the particles, and
- recovery of the particles thus formed.

13. A process for preparing the material according to claim 8 comprising contacting a matrix with at least one set of particles, where the particles are individualized, and have diameters of between 0.2 and 5 micrometers and specific surfaces greater than or equal to 15 $m^2/g$ and wherein the particles have a coefficient of sphericity of greater than or equal to 0.75.

14. The process according to claim 13, further comprising a forming step for the material, where the forming step for the material does not require any further dispersing of the particles within the matrix, compared with the forming process used for matrices which do not include particles.

* * * * *